(12) United States Patent
Schattner et al.

(10) Patent No.: US 10,768,029 B2
(45) Date of Patent: Sep. 8, 2020

(54) MODULAR SENSOR SYSTEM HAVING A HOUSING WITH SNAP FIT FEATURES

(71) Applicant: Eaton Intelligent Power Limited, Dublin (IE)

(72) Inventors: David Schattner, Newnan, GA (US); Yia-Bo Joshua Deng, Tyrone, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/400,721

(22) Filed: May 1, 2019

(65) Prior Publication Data

US 2019/0339099 A1 Nov. 7, 2019

Related U.S. Application Data

(60) Provisional application No. 62/666,676, filed on May 3, 2018.

(51) Int. Cl.
*G01D 11/24* (2006.01)
*F21V 15/01* (2006.01)
*F16B 5/10* (2006.01)

(52) U.S. Cl.
CPC .............. *G01D 11/245* (2013.01); *F16B 5/10* (2013.01); *F21V 15/01* (2013.01)

(58) Field of Classification Search
CPC .......... G01D 11/245; F16B 5/10; F21V 15/01
See application file for complete search history.

(56) References Cited

U.S. PATENT DOCUMENTS

2018/0166026 A1* 6/2018 Kumar .................... F21V 23/04
2019/0116297 A1* 4/2019 Youmans ............. H04N 5/2252

* cited by examiner

*Primary Examiner* — Joseph L Williams
(74) *Attorney, Agent, or Firm* — King & Spalding LLP

(57) ABSTRACT

A modular sensor system includes a receptacle that is configured to be coupled to a luminaire. Further, the modular sensor system includes a sensor housing that is configured house a sensor device therein. The sensor housing includes flexible snap fit features that are configured to removably couple the sensor housing to the receptacle by a twist and lock mechanism. Each flexible snap fit feature includes a curved cantilever snap fit defined by a portion of the sidewall of the sensor housing and a hook that extends radially outward from the curved cantilever snap fit. The hooks are configured to engage corresponding slots in the receptacle to couple the sensor housing to the receptacle by rotating the sensor housing within the receptacle in a first direction. The hooks are also configured to decouple the sensor housing from the receptacle by further rotating the sensor housing in the first direction.

20 Claims, 11 Drawing Sheets

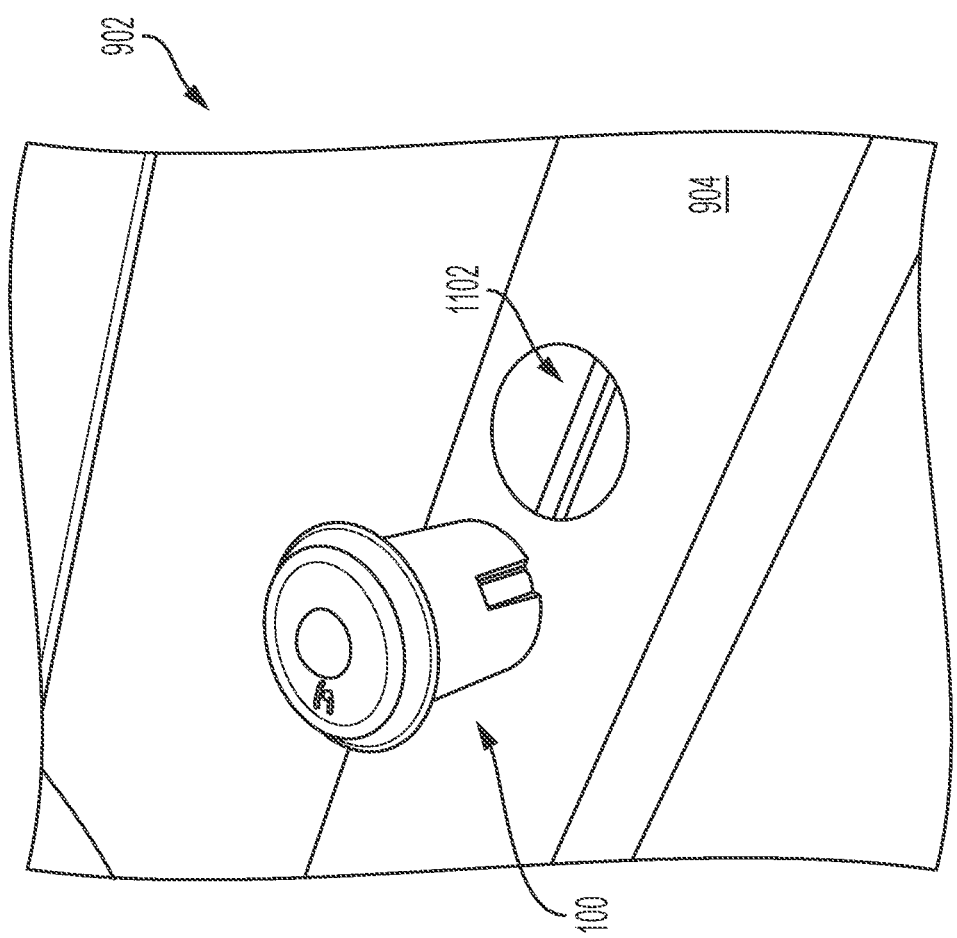

MODULAR SENSOR SYSTEM HAVING A HOUSING WITH SNAP FIT FEATURES

RELATED APPLICATIONS

The present application claims priority to U.S. Provisional Patent Application No. 62/666,676, filed May 3, 2018, and titled "Modular Sensor System," the entire contents of which is incorporated herein by reference.

TECHNICAL FIELD

Embodiments of the present disclosure relate generally to sensor systems, and more particularly to a modular sensor system for luminaires.

BACKGROUND

Many existing luminaires include one or more sensors that improve an efficiency of the luminaires and/or add functionality to the luminaires. Traditionally, the sensors are integrated into the luminaire and are not easily removable and/or replaceable in the field by the end user without having to disassemble the luminaire or replace the whole luminaire. The difficulty to remove, replace, and/or install the sensors in the field limits the end user's ability to upgrade the sensors that may become outdated within a few years of installation due to the rapid change in technology, replace the sensor that is provided with the luminaire with a different type of sensor, install a sensor of the end user's choice in the luminaire, etc. In other words, existing luminaires and traditional sensors used in said luminaires lack modularity and therefore, the end user may be stuck with the sensors that were factory installed and present in the luminaire at a time of purchase.

This background information is provided to reveal information believed to be of possible relevance to the present disclosure. No admission is necessarily intended, nor should be construed, that any of the preceding information constitutes prior art against the present disclosure.

SUMMARY

In one aspect, the present disclosure is related to a modular sensor system. The modular sensor system includes a receptacle that comprises a first inner cavity that is defined by a top wall comprising a first slot and a first side wall comprising a pair of second slots. Further, the modular sensor system includes a sensor housing that is configured to be removably coupled to the receptacle and disposed in the first inner cavity. The sensor housing includes a second side wall that comprises a pair of curved cantilever snap fit assemblies formed therein and a locking tab extending from a top edge of the second side wall. The pair of curved cantilever snap fit assemblies are configured to engage with the pair of second slots in the receptacle and the locking tab is configured to engage with the first slot when the sensor housing is removably coupled to the receptacle.

In another aspect, the present disclosure is related to a modular sensor system that includes a sensor housing. The sensor housing includes a sidewall that defines an inner cavity that is configured to house a sensor device therein. A portion of the sidewall defines flexible snap fit features that are configured to couple the sensor housing with a luminaire and decouple the sensor housing from the luminaire. The luminaire includes a luminaire cavity that is configured to receive and removably couple the sensor housing therein. Further, the sensor housing includes a flange that is disposed at one end of the sidewall. A portion of the flange extends into the cavity to support the sensor device thereon.

In yet another aspect, the present disclosure is related to a luminaire. The luminaire includes a housing that has a sensor receiving opening formed in a portion thereof. The portion of the housing is exposed to an area that is to be illuminated by the luminaire. The luminaire includes a receptacle that is coupled to the luminaire such that the receptacle extends into the luminaire through the sensor receiving opening. The receptacle comprises a first inner cavity that is defined by a top wall comprising a first slot and a first side wall comprising a pair of second slots. Further, the luminaire includes a sensor housing that is removably coupled to the receptacle and disposed in the first inner cavity. The sensor housing includes a second side wall that comprises a pair of curved cantilever snap fit assemblies formed therein and a locking tab extending from a top edge of the second side wall. The pair of curved cantilever snap fit assemblies are configured to engage with the pair of second slots in the receptacle and the locking tab is configured to engage with the first slot when the sensor housing is removably coupled to the receptacle.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein:

FIGS. 9-11 illustrate the modular sensor system of FIG. 1 being installed in a luminaire, in accordance with example embodiments of the present disclosure.

Figure 1:
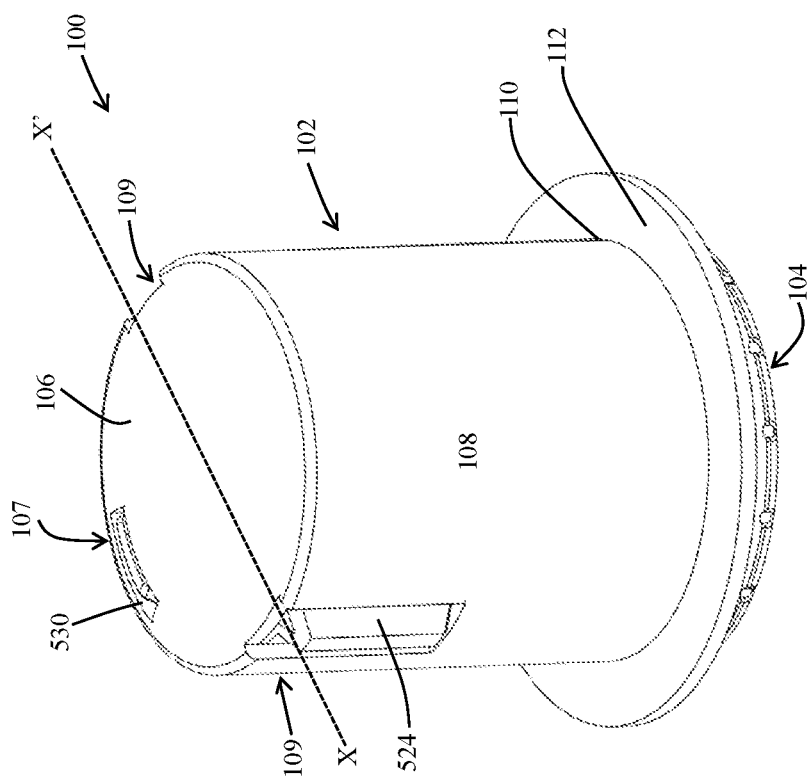
FIG. 1 illustrates a perspective view of an example modular sensor system, in accordance with example embodiments of the present disclosure.
Figure 2:
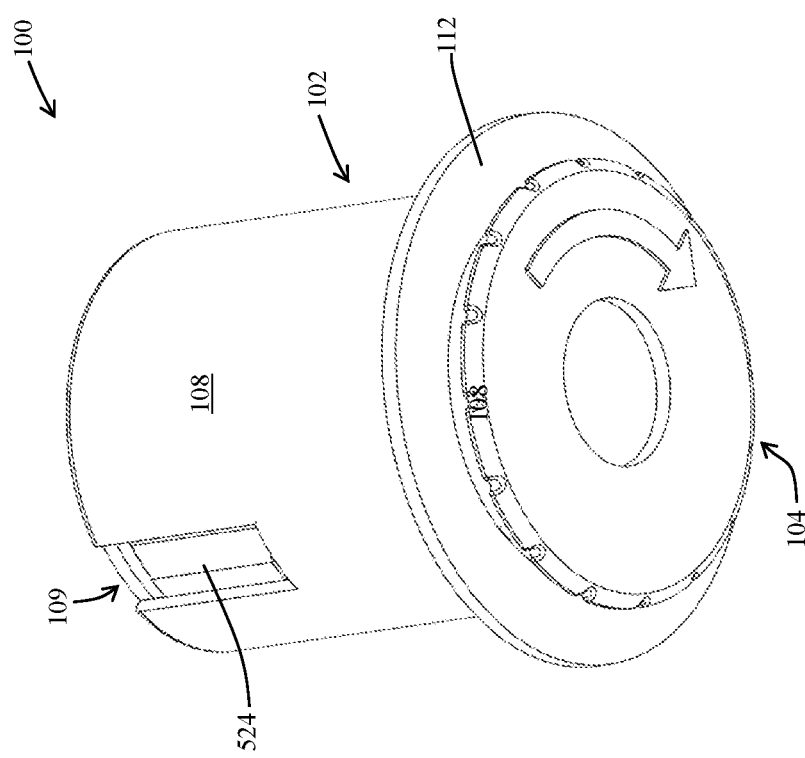
FIG. 2 illustrates another perspective view of the example modular sensor system, in accordance with example embodiments of the present disclosure.
Figure 3:
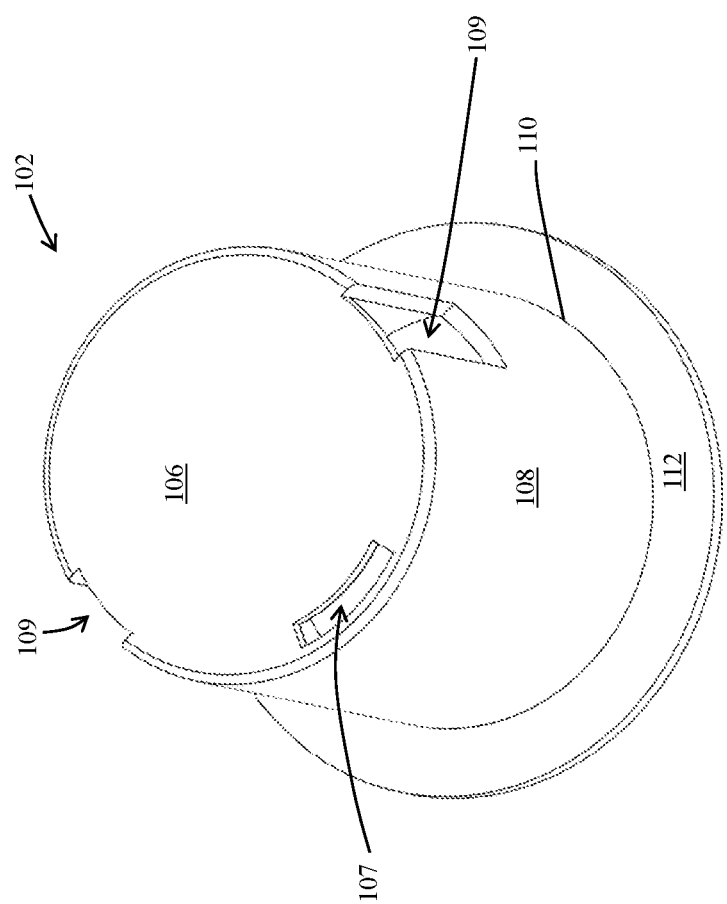
FIG. 3 illustrates a perspective view of an example sensor housing receptacle of the example modular sensor system of FIG. 1, in accordance with example embodiments of the present disclosure.
Figure 4:
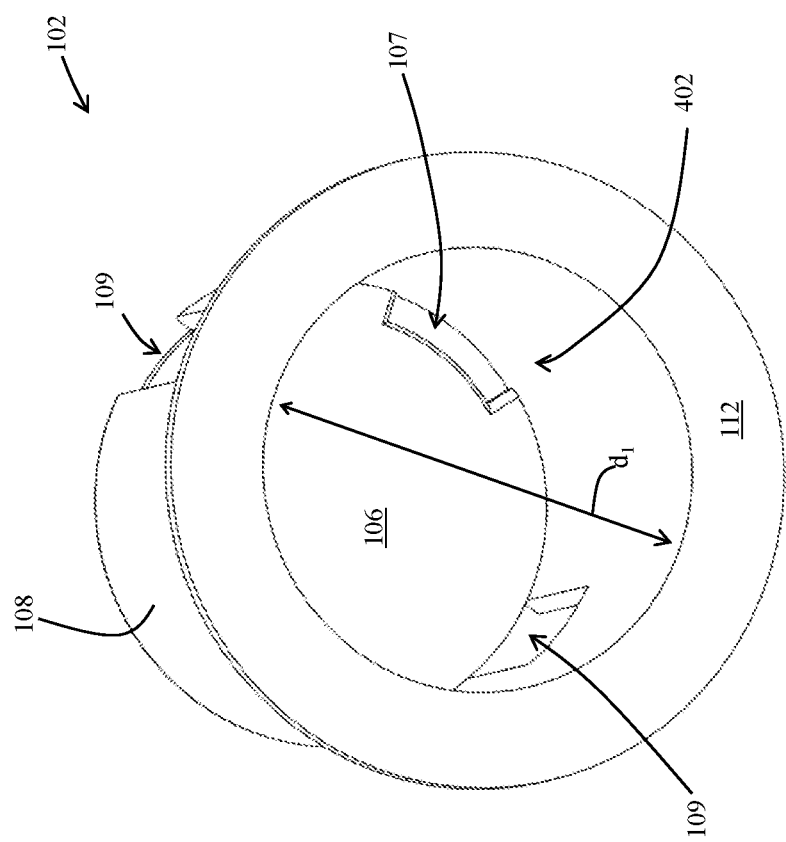
FIG. 4 illustrates another perspective view of the example sensor housing receptacle of the example modular sensor system of FIG. 1, in accordance with example embodiments of the present disclosure.

The drawings illustrate only example embodiments of the present disclosure and are therefore not to be considered limiting in scope, as the present disclosure may admit to other equally effective embodiments. The elements and features shown in the drawings are not necessarily to scale, emphasis is instead placed upon clearly illustrating the principles of the example embodiments. Additionally, certain dimensions or positions may be exaggerated to help visually convey such principles.

DETAILED DESCRIPTION OF EXAMPLE EMBODIMENTS

The present disclosure describes a modular sensor system for luminaires. The modular sensor system includes a sensor housing receptacle that is disposed in a luminaire and defines a cavity. Further, the modular sensor system includes a sensor housing that is configured to be removably coupled to the sensor housing receptacle and disposed in the cavity. The sensor housing may be removably coupled to the receptacle by a twist and lock mechanism using snap fits. The sensor housing may be twisted in a first direction to be coupled to the receptacle. For example, when the sensor housing is pushed into the cavity defined by the sensor housing receptacle and twisted in a first direction, one or more hooks of the snap fits of the sensor housing may engage corresponding slots in the sensor housing receptacle to couple the sensor housing to the sensor housing receptacle. Once the sensor housing is coupled to the sensor housing receptacle, the sensor housing may be twisted further in the first direction to decouple the sensor housing from the sensor housing receptacle.

In one example, the sensor housing receptacle may be installed in the luminaire during manufacturing using any appropriate attachment mechanism, and the sensor housing may be field installed in the sensor housing receptacle, removed from the sensor housing receptacle, and/or replaced by an end user. However, in some examples, the sensor housing may be installed in the sensor housing receptacle during manufacturing but may be removed and/or replaced by an end user in the field.

The sensor housing is configured to house any appropriate sensor device therein. The sensor housing may be configured such that a sensor device that is disposed therein is easily replaceable with other sensor devices. Further, the sensor housing may be configured to be installed in any appropriate luminaire equipped with the sensor housing receptacle or a functionally similar component. In other words, the modular sensor system provides modularity that allows a single universal sensor housing to be used across several different luminaires. For example, a first sensor housing that comprises a daylight sensor device and that is installed in a first luminaire may be removed therefrom and installed in a second luminaire that is different from the first luminaire, provided both the first and second luminaires comprise a sensor housing receptacle installed therein that is configured to receive the sensor housing. In said example, a second sensor housing comprising an occupancy sensor device may be installed in the first luminaire from which the first sensor housing was removed. In some examples, the daylight sensor device disposed in the first sensor housing may be replaced with a motion sensor device prior to installation in the second luminaire, and so on.

The modular sensor system is configured such that the sensor housing (i.e., the sensor housing receptacle) may be installed in a luminaire fitted with the sensor housing receptacle without tools. Further, the sensor housing may be configured to be installed "blind" (i.e., without needing to expose personnel to hazardous electricity by accessing to the inside of the luminaire or having to disassemble the luminaire).

Referring to FIGS. 1-11, a modular sensor system 100 may include a sensor housing receptacle 102 and a sensor housing 104 that is configured to be removably coupled to the sensor housing receptacle 102. The sensor housing receptacle 102 (herein 'receptacle 102') may include a top wall 106 that is substantially circular in shape. The top wall may include a first slot 107 formed therein. The first slot 107 may be a through slot that is curved in shape and disposed adjacent a perimeter of the top wall 106. However, in other example embodiments, the first slot 107 may be a blind slot and/or the first slot 107 may have any other shape without departing from a broader scope of the present disclosure. Further, in other example embodiments, the top wall 106 may include other openings such as a through opening for wires or pogo pin receptacles. In some example embodiments, the top wall 106 may include other connection features such as spring loaded pogo pins that are configured to engage with pin receptacles in the sensor housing.

Further, the receptacle 102 may include a first side wall 108 that extends substantially perpendicular to the top wall 106 from a perimeter of the top wall 106 to a first bottom edge 110. The first side wall 108 may be substantially cylindrical in shape and may include two second slots 109 formed therein. One of skill in the art can understand and appreciate that in other example embodiments, the receptacle 102 may include fewer or more number of second slots 109 that are configured to receive corresponding snap fit hooks 524 in the sensor housing 104. The two second slots 109 may be disposed opposite to each other and spaced approximately 180 degrees apart. Each second slot 109 may extend from a portion of the perimeter of the top wall 106 towards the first bottom edge 110 of the side wall 108. One of skill in the art can understand and appreciate that in other example embodiments, the second slots may be formed at any other portion of the side wall of the receptacle based on the shape and positioning of the snap fit hooks in the sensor housing without departing from a broader scope of the present disclosure.

The top wall 106 and the side wall 108 may define a first inner cavity 402 having a first diameter 'd1'. Furthermore, the receptacle 102 may include a first flange 112 that extends radially outward and substantially perpendicular to the first side wall 108 from the first bottom edge 110 of the first side wall 108. In some example embodiments, the receptacle 102 may not include the first flange without departing from a broader scope of the present disclosure.

The receptacle 102 may be coupled to a luminaire 902 (shown in FIG. 9) via any appropriate coupling mechanisms such as fasteners, adhesives, welding, etc. In particular, the receptacle 102 may be disposed in a sensor receiving opening 1102 (shown in FIG. 11) formed in a housing 904 of the luminaire 902 or any other appropriate portion of the luminaire 902 such that the receptacle 102 and the first inner cavity 402 defined by the receptacle 102 may be easily and readily accessible to an end user for coupling the sensor housing 104 without having to disassemble the luminaire 902. In some example embodiments, the receptacle 102 may be integrally formed with the luminaire 902 as part of the luminaire 902 rather than being coupled to the luminaire 902. Even though the present disclosure describes and illustrates the receptacle 102 as being substantially cylindrical in shape, one of skill in the art can understand and appreciate that in other example embodiments, the top wall and the side wall of the receptacle can have any other appropriate shape without departing from a broader scope of the present disclosure.

Figure 5:
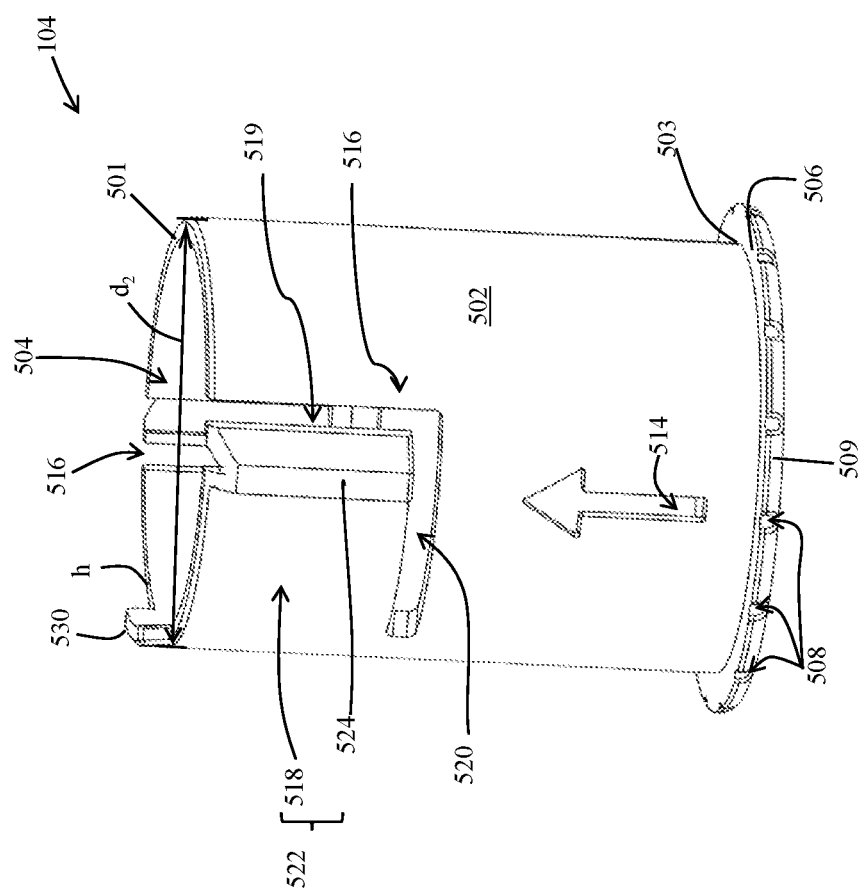
FIG. 5 illustrates a perspective view of an example sensor housing of the example modular sensor system of FIG. 1, in accordance with example embodiments of the present disclosure.
Figure 6:
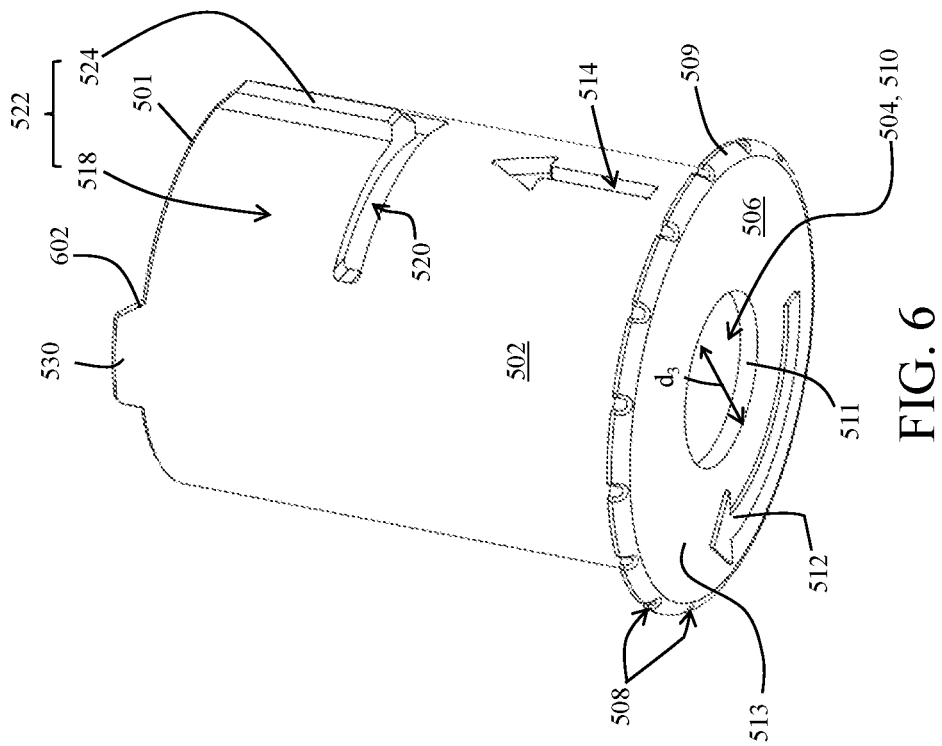
FIG. 6 illustrates another perspective view of the example sensor housing of the modular sensor system of FIG. 1, in accordance with example embodiments of the present disclosure.
Figure 7:
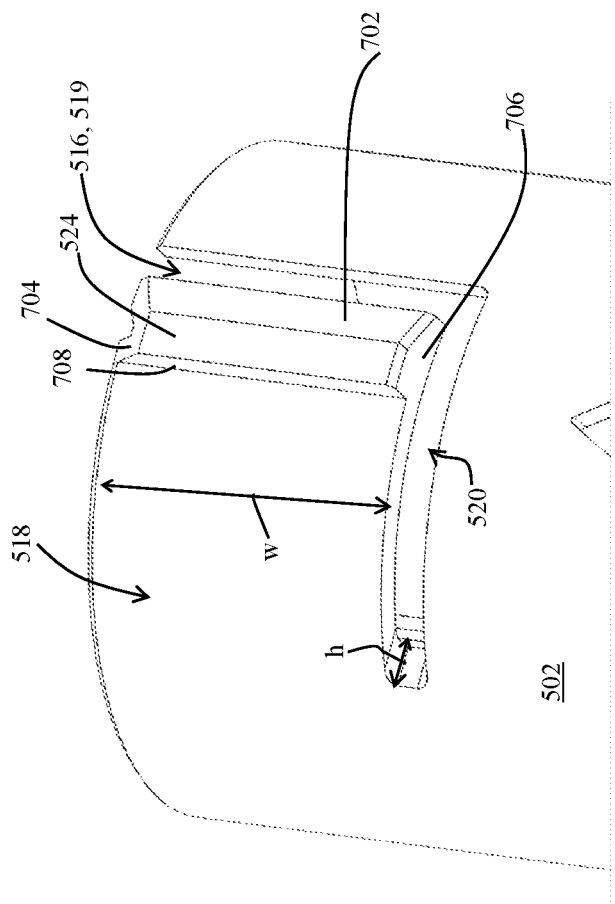
FIG. 7 illustrates an enlarged view of the curved cantilever snap fit assembly of the example sensor housing, in accordance with example embodiments of the present disclosure.
Figure 8:
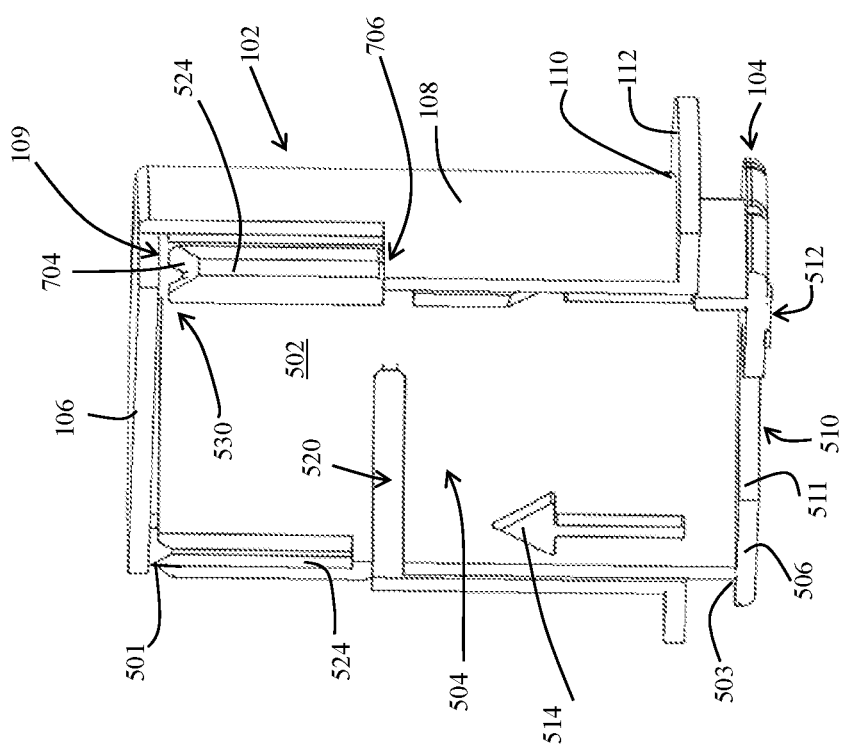
FIG. 8 illustrates a cross-sectional view of the example modular sensor system of FIG. 1 along an X-X' axis, in accordance with example embodiments of the present disclosure.
Figure 9:
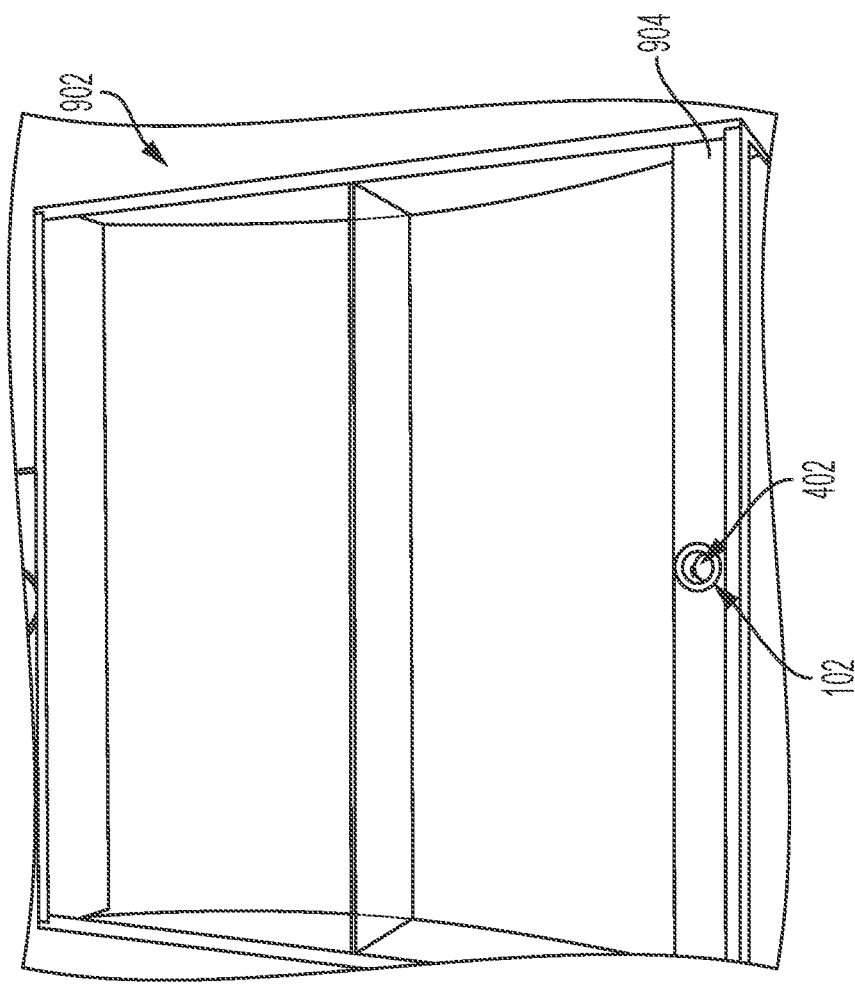
Figure 10:
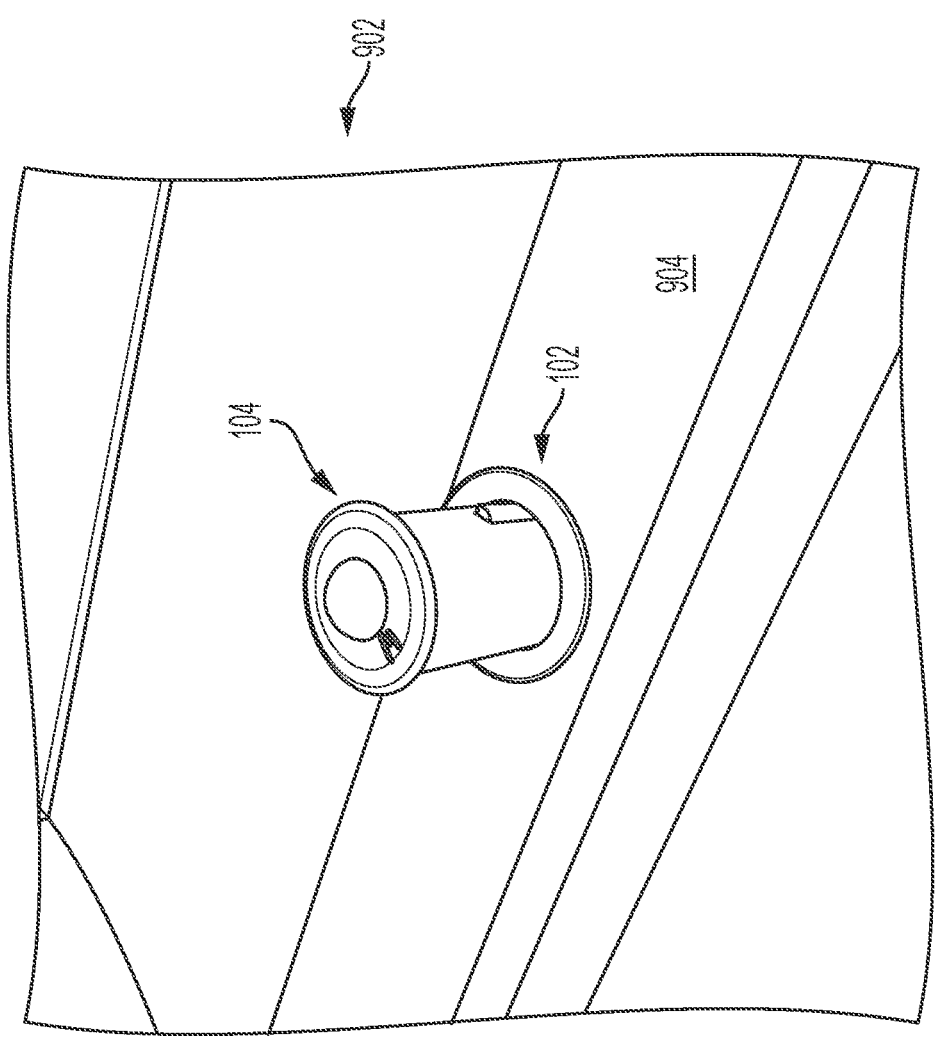

Referring to FIGS. 5-7, the sensor housing 104 may include a second side wall 502 that extends from a top edge 501 to a second bottom edge 503 and defines a second inner cavity 504 that is configured to house any appropriate sensor device therein. The sensor device may include, but is not limited to, a daylight sensor, an occupancy sensor, a motion sensor, etc. The top edge 501 and the second bottom edge 503 may be substantially circular in shape, and the second side wall 502 may be substantially cylindrical in shape. The second side wall 502 may have second diameter 'd2' that may be smaller than the first diameter 'd1' of the first inner cavity 402 defined by the receptacle 102 such that the sensor housing 104 can fit within the first inner cavity 402 of the receptacle 102 and be coupled thereto.

Even though the present disclosure describes the sensor housing 104 as being substantially cylindrical in shape, one of skill in the art can understand and appreciate that the sensor housing can have any other appropriate shape that allows the sensor housing to be disposed in and be coupled to the sensor housing receptacle 102 without departing from a broader scope of the present disclosure. In some example embodiments, the shape of the sensor housing may be based on the shape of the sensor housing receptacle or the shape of the first cavity defined by the sensor housing receptacle that is configured to receive the sensor housing therein.

In addition to the second side wall 502, the sensor housing 104 may include a second flange 506 that extends: (a) radially outward and substantially perpendicular to the second side wall 502 from the second bottom edge 503 of the second side wall 502, and/or (b) radially inwards into the second inner cavity 504. The outer edge 509 of the second flange 506 may include a plurality of grooves 508 that are cut into the second flange 506. The plurality of grooves 508 define a grip feature to provide a grip to the end user while coupling or decoupling the sensor housing 104 from the receptacle 102 in the luminaire 902. In some example embodiments, no gripping feature may be present or any other appropriate gripping features may be formed in the second flange or any other portion of the sensor housing 104 without departing from a broader scope of the present disclosure. The second flange 506 may extend from the outer edge 509 to an inner edge 511 that is concentric with the outer edge 509. The inner edge 511 may define a sensor window opening 510 (herein 'sensor window 510') that has a third diameter 'd3' that is smaller than a diameter of the second inner cavity 504 defined by the second side wall 502 of the sensor housing 104. The portion of the second flange 506 that extends radially inwards into the second inner cavity 504 and to the inner edge 511 may be configured to support and securely retain the sensor device within the second inner cavity 504 of the sensor housing 104. The sensor window 510 may be configured to receive a lens of the sensor device therethrough to collect light or a microphone to collect sound signals as two non-limiting examples.

The second flange 506 may include a first guidance feature 512 such as an directional arrow that is molded into a bottom surface 513 of the second flange 506 to provide assistance to an end user in coupling the sensor housing 104 with the receptacle 102. In addition to the first guidance feature 512, the sensor housing 104 may include a second guidance feature 514 that is formed in the second side wall 502 of the sensor housing 104. In particular, the second guidance feature 514 may include a pair of third through slots in the shape of arrows pointed towards the top edge 501 of the second side wall 502. The first guidance feature 512 and the second guidance feature 514 may together indicate a direction in which an end user should adjust (e.g., twist, push, pull, etc.) the sensor housing 104 to couple the sensor housing 104 with the receptacle 102 or decouple the sensor housing 104 from the receptacle 102. In some example embodiments, the modular sensor system 100, i.e., the sensor housing 104 and the receptacle 102 may have any other type of guidance features and are not limited to the example ones (512, 514) described above. However, in other example embodiments, the modular sensor system 100 may not include the first and second guidance features without departing from a broader scope of the present disclosure.

The sensor housing 104 may further include a pair of L-shaped slots 516 (or cut outs) formed in the second side wall 502. The L-shaped slots 516 are disposed opposite to each other and disposed at 180 degrees separation from each other. Each L-shaped slot 516 may comprise a fourth through slot 519 that extends from the top edge 501 towards the bottom edge 503 of the second side wall 502 and a fifth through slot 520 that extends in a first direction (e.g., clockwise direction) from an end of the fourth through slot 519 and substantially perpendicular to the fourth through slot 519. In particular, each L-shaped slot 516 defines a curved cantilever beam snap fit 518 (herein 'curved cantilever snap fit 518') of the snap fit assembly 522. The snap fit assembly 522 may further include a hook 524 that is disposed adjacent to the fourth through slot 519 of each L-shaped slot 516. The hook 524 may be a protrusion that extends out of the second side wall 502 and extends from the top edge 501 of the second side wall 502 towards the fifth through slot 520 of the L-shaped slot 516 such that the hook 524 is substantially parallel to the fourth through slot 519 and substantially perpendicular to the fifth through slot 520. The snap fit assembly 522 may be disposed between the top edge 501 and the second guidance feature 514.

The snap fit assembly 522 of the sensor housing 104 may be configured to securely couple the sensor housing 104 to the receptacle 102. In particular, the hooks 524 of the snap fit assembly 522 may be configured to engage with or fit into the pair of second slots 109 formed in the first side wall 108 of the receptacle 102. In other words, one hook 524 fits in one second slot 109 and the second hook 524 on the opposite side of the sensor housing 104 fits in the other second slot 109 on the opposite side of the receptacle 102. Additionally, the sensor housing 104 may include a locking tab 530 that extends further upwards (away from and opposite to the second bottom edge 503 and second flange 506) from the top edge 501. The locking tab 530 may be configured to engage with or fit into the first slot 107 formed in the top wall 106 of the receptacle 102. The locking tab 530 defines a poka-yoke element that is configured to prevent an incorrect insertion of the sensor housing 104 or coupling of the sensor housing 104 in a wrong direction within the receptacle 102 that may result in an electrical contact misalignment. In other words, the locking tab 530 ensures that: (a) the sensor housing 104 twists and locks into the receptacle 102 only in one direction (the first direction) to prevent misalignment of electrical contacts (not shown) such that they are out of polarity, and (b) the hooks 524 of the snap fit assembly 522 are aligned correctly in the second slots 109 of the receptacle 102. The locking tab 530 may be defined such that the electrical contacts do not engage until the locking tab 530 fits in or engages with the first slot 107 on the top wall 106 of the receptacle 102. In some example embodiments, the sensor housing 104 may not include the locking tab 530.

The sensor housing 104 may be removably coupled to the receptacle 102 by inserting the sensor housing 104 into the first inner cavity 402 defined by the receptacle 102 using a twist and lock motion where the hooks 524 of the snap fit assembly 522 on the sensor housing 104 snap into the second slots 109 formed in the first side wall 108 of the receptacle 102. In particular, initially, the sensor housing 104 may be positioned below the receptacle 102 and axially aligned with the first inner cavity 402 defined by the receptacle 102. Then, the sensor housing 104 may be pushed up towards the first inner cavity 402 of the receptacle 102 and twisted in a first direction (as indicated by the guidance features (512, 514) till: (a) the hooks 524 of the snap fit assembly 522 on the sensor housing 104 engage with or fit into the second slots 109 formed in the first side wall 108 of the receptacle 102, and (b) the locking tab 530 engages with or fits into the first slot 107 formed in the top wall 106 of the receptacle 102. When the snaps engage/detent, their "click" may provide positive feedback that the sensor housing 104 installed correctly within the receptacle 102.

Once the sensor housing 104 is coupled to the receptacle 102 and thereby to the luminaire 902, the bottom flat edges 706 of the hooks 524 that engage the edges of receptacle 102 that define the second slots 109 of the receptacle 102 and the width 'w' of the curved cantilever snap fits 518 (measured from the top edge towards the fifth through slot 520) provides resistance against gravity to prevent the sensor housing 104 from inadvertently decoupling or falling out from the receptacle 102 under gravity. While the width 'w' of the curved cantilever snap fits 518 provides strength against gravity once the sensor housing 104 is coupled to the receptacle 102, the thickness 'h' of the curved cantilever snap fits 518 may be relatively thin when compared to the width 'w' to allow the curved cantilever snap fits 518 to be easily flexible such that when a pressure is applied the curved cantilever snap fit 518 deflects inward into the second inner cavity 504, and when the pressure is released the curved cantilever snap fit 518 reverts back to its default state (shown in FIGS. 1, 2, and 5-8). Further, the hooks 524 of the snap fit assembly 522 may include retention faces 708 (e.g., a flat back edge as shown in FIGS. 5-8) to prevent rotation of the sensor housing 104 in a direction opposite to the first direction (direction in which the sensor housing is rotated to couple the sensor housing 104 to the receptacle 102) once the hooks 524 of the sensor housing 104 are snapped into the second slots 109 of the receptacle 102. The flat back edge 708 may be referred to as a catch edge that ensures that the sensor housing 104 can only be rotated in one direction (first direction).

The sensor housing 104 may be decoupled from the receptacle 102 and the luminaire 902 by: (a) twisting the sensor housing 104 in the same first direction in which the sensor housing 104 is twisted to couple the sensor housing 104 with the receptacle 102 and (b) pulling the sensor housing 104 away from the receptacle 102. The hooks 524 of the snap fit assembly 522 and the locking tab 530 may have beveled edges (also referred to as 'ramped edges', 'cam edges', etc.) that assist in decoupling the sensor housing 104 from the receptacle 102 when it is twisted in the first direction from an installed position (shown in FIGS. 1 and 2). Each hook 524 may include a first beveled long edge 702 facing the first direction, and the locking tab 530 may include a second beveled edge 602 facing the first direction. That is, the beveled edges of the locking tab and the hooks of the snap fit face the same direction. The first beveled long edge 702 of the hooks 524 and the second beveled edge 602 of the locking tab 530 may be referred to as decoupling edges that assist with decoupling the sensor housing 104 from the receptacle. When the sensor housing 104 that is coupled to the receptacle 102 is twisted in the first direction, the decoupling edges of the hooks 524 and the locking tab 530 operate in concert to decouple the sensor housing 104 from the receptacle 102. In particular, first beveled long edges 702 of the two hooks 524 engage with the first side wall 108 of the receptacle 102 and the second beveled edge 602 of the locking tab 530 engages the top wall 106 of the receptacle 102 and slide over the first side wall 108 of the receptacle 102 and the top wall 106 of the receptacle 102 to decouple the sensor housing 104 from the receptacle 102. Further, the curved cantilever snap fits 518 may deflect or bend inwards into the second inner cavity 504 as the sensor housing 104 is twisted in the first direction to decouple the sensor housing 104 from the receptacle 102.

In addition to the first beveled long edge 702, each hook 524 of the snap assembly 522 may include a third beveled short edge 704 that enables the sensor housing 104 to be pushed up into the first inner cavity 402 defined by the receptacle 102 for coupling the sensor housing 104 to the receptacle 102. The first and second guidance features (512, 514) may indicate the direction in which to push the sensor housing 104 and the first direction in which the sensor housing 104 should be twisted for coupling the sensor housing 104 to the receptacle 102. Further, the first guidance feature 512 may indicate the direction in which to twist the sensor housing 104 to decouple the sensor housing 104 from the receptacle 102.

It is noted that in some example embodiments, the sensor housing 104 can have any other appropriate shape that may be compatible with or complementary to the shape of the receptacle and the first cavity defined by the receptacle without departing from a broader scope of the present disclosure. Furthermore, in some examples, the sensor housing 104 may include a top wall. Additionally, even though the present disclosure describes the modular sensor system 100 as being used with luminaires, one of skill in the art can understand and appreciate that in other example embodiments, the modular sensor system 100 may be used with any other appropriate non-lighting device without departing from a broader scope of the present disclosure.

Even though the present disclosure describes the receptacle 102 as comprising the first and second slots (107, 109) and the sensor housing 104 as comprising the locking tab 530 and the snap fit assemblies 522, one of skill in the art can understand and appreciate that in some example embodiments, the receptacle 102 may include the locking tab 530 and the snap fit assemblies 522 while the sensor housing 104 comprises the first and second slots (107, 109) without departing from a broader scope of the present disclosure. In said some example embodiments, locking tab 530 and the hooks 524 of the snap fit assemblies may extend into the first inner cavity 402 of the receptacle 102 from an inner surface of the receptacle 102.

Although the present disclosure is described with reference to example embodiments, it should be appreciated by those skilled in the art that various modifications are well within the scope of the present disclosure. From the foregoing, it will be appreciated that an embodiment of the present disclosure overcomes the limitations of the prior art. Those skilled in the art will appreciate that the present disclosure is not limited to any specifically discussed application and that the embodiments described herein are illustrative and not restrictive. From the description of the example embodiments, equivalents of the elements shown therein will suggest themselves to those skilled in the art, and ways of constructing other embodiments of the present disclosure will suggest themselves to practitioners of the art. Therefore, the scope of the present disclosure is not limited herein.

What is claimed is:

1. A modular sensor system comprising:
   a receptacle that comprises a first inner cavity that is defined by a top wall comprising a first slot and a first side wall comprising a pair of second slots; and
   a sensor housing that is configured to be removably coupled to the receptacle and disposed in the first inner cavity, the sensor housing comprising:
      a second side wall that comprises a pair of curved cantilever snap fit assemblies formed therein and a locking tab extending from a top edge of the second side wall,
         wherein the pair of curved cantilever snap fit assemblies are configured to engage with the pair of second slots in the receptacle and the locking tab is configured to engage with the first slot when the sensor housing is removably coupled to the receptacle.

2. The modular sensor system of claim 1:
   wherein the sensor housing is coupled to the receptacle by twisting the sensor housing into the first inner cavity defined by the receptacle in a first direction, and
   wherein when the sensor housing is coupled to the receptacle, the sensor housing is decoupled from the receptacle by further twisting the sensor housing in the first direction.

3. The modular sensor system of claim 1, wherein the receptacle is configured to be disposed in a luminaire.

4. The modular sensor system of claim 1, wherein each curved cantilever snap fit assembly comprises:
   a curved cantilever snap fit that is defined by an L-shaped slot formed in the second side wall of the sensor housing; and
   a hook that is formed adjacent the L-shaped slot,
      wherein the hook of each curved cantilever snap fit assembly is configured to fit in a respective second slot of the pair of second slots of the receptacle.

5. The modular sensor system of claim 4, wherein the hook extends radially outward from the second side wall of the sensor housing and comprises a first beveled long edge facing the first direction, and wherein the first beveled long edge of each hook of the pair of curved cantilever snap fit assemblies operates in concert with a second beveled edge of the locking tab that faces the first direction to decouple the sensor housing from the receptacle.

6. The modular sensor system of claim 2, wherein the locking tab is a poka-yoke element that is configured to prevent a twisting of the sensor housing in a second direction that is opposite to the first direction.

7. The modular sensor system of claim 1, wherein the second side wall defines a second inner cavity that is configured to house a sensor device, and wherein the sensor housing further comprises a flange that extends: (a) radially outward from a bottom edge of the second side wall towards an outer edge, and (b) radially inward into the second inner cavity towards an inner edge that defines a sensor window opening.

8. The modular sensor system of claim 7, wherein the outer edge of the flange comprises a plurality of grooves that defines a gripping feature.

9. A modular sensor system comprising:
   a sensor housing comprising:
      a sidewall that defines an inner cavity that is configured to house a sensor device therein, a portion of the sidewall defining flexible snap fit features that are configured to couple the sensor housing with a luminaire and decouple the sensor housing from the luminaire,
         wherein the luminaire comprises a luminaire cavity that is configured to receive and removably couple the sensor housing therein; and
      a flange that is disposed at one end of the sidewall, a portion of the flange extending into the cavity to support the sensor device thereon.

10. The modular sensor system of claim 9, wherein
   wherein the sensor housing is configured to be coupled to the luminaire by twisting the sensor housing into the luminaire cavity of the luminaire in a first direction, and
   wherein when the sensor housing is coupled to the luminaire cavity, the sensor housing is configured to be decoupled from the luminaire cavity by further twisting the sensor housing in the first direction.

11. The modular sensor system of claim 9, wherein the luminaire comprises a receptacle that defines the luminaire cavity, and wherein the receptacle is integrally formed with the luminaire.

12. The modular sensor system of claim 9, wherein the flange defines a sensor window opening such that, when the sensor device is installed in the sensor housing, a portion of the sensor device is exposed through the sensor window opening to an area that is to be illuminated by the luminaire.

13. The modular sensor system of claim 9, wherein the flexible snap fit features comprise a curved cantilever snap fit assembly.

14. The modular sensor system of claim 9, wherein the flexible snap fit features comprise:
   a curved cantilever snap fit that is defined by a slot formed in the second side wall of the sensor housing; and
   a hook that is formed adjacent the slot,
      wherein the hook of each curved cantilever snap fit assembly is configured to fit in a corresponding slot formed in the luminaire.

15. The modular sensor system of claim 14:
   wherein the hook extends radially outward from the sidewall of the sensor housing and comprises a beveled long edge facing a first direction and a flat back edge disposed opposite to the beveled long edge, and
   wherein the beveled long edge of each hook of the flexible snap fit features operates in concert to decouple the sensor housing from the luminaire when the sensor housing that is coupled to the luminaire is rotated in the first direction while the flat back edge prevents a rotation of the sensor housing that is coupled to the luminaire in a second direction, the second direction being opposite to the first direction.

16. A luminaire comprising:
   a housing that has a sensor receiving opening formed in a portion thereof, the portion being exposed to an area that is to be illuminated by the luminaire;
   a receptacle that is coupled to the luminaire such that the receptacle extends into the luminaire through the sensor receiving opening, the receptacle comprising a first inner cavity that is defined by a top wall comprising a first slot and a first side wall comprising a pair of second slots; and
   a sensor housing that is removably coupled to the receptacle and disposed in the first inner cavity, the sensor housing comprising:

a second side wall that comprises a pair of curved cantilever snap fit assemblies formed therein and a locking tab extending from a top edge of the second side wall,
  wherein the pair of curved cantilever snap fit assemblies are configured to engage with the pair of second slots in the receptacle and the locking tab is configured to engage with the first slot when the sensor housing is removably coupled to the receptacle.

17. The luminaire of claim 16, wherein each curved cantilever snap fit assembly comprises:
a curved cantilever snap fit that is defined by an L-shaped slot formed in the second side wall of the sensor housing; and
a hook that is formed adjacent the L-shaped slot,
  wherein the hook of each curved cantilever snap fit assembly is configured to fit in a respective second slot of the pair of second slots of the receptacle.

18. The luminaire of claim 17, wherein the hook extends radially outward from the second side wall of the sensor housing and comprises a first beveled long edge facing the first direction, and wherein the first beveled long edge of each hook of the pair of curved cantilever snap fit assemblies operates in concert with a second beveled edge of the locking tab that faces the first direction to decouple the sensor housing from the receptacle.

19. The luminaire of claim 16, wherein the second side wall defines a second inner cavity that is configured to house a sensor device, and wherein the sensor housing further comprises a flange that extends: (a) radially outward from a bottom edge of the second side wall towards an outer edge, and (b) radially inward into the second inner cavity towards an inner edge that defines a sensor window opening.

20. The luminaire of claim 19, wherein the outer edge of the flange comprises a plurality of grooves that defines a gripping feature.

* * * * *